350-321. SR 07-18-72 OR 3,677,623

United States Patent

Hall et al.

[15] 3,677,623

[45] July 18, 1972

[54] CLEAN WINDOW ASSEMBLY FOR REAL TIME FINGERPRINT INPUT TO FINGERPRINT IDENTIFICATION SYSTEM

[72] Inventors: William D. Hall, Van Nuys, Calif.; Vernon J. Burzan, Dexter, Mich.

[73] Assignee: KMS Industries, Inc., Ann Arbor, Mich.

[22] Filed: Nov. 2, 1970

[21] Appl. No.: 86,087

[52] U.S. Cl. ....................350/321, 356/168

[51] Int. Cl. ....................G01b 11/24

[58] Field of Search ....................350/321; 356/71, 156, 168

[56] References Cited

UNITED STATES PATENTS 3,584,958 6/1971 Miller ....................356/71

*Primary Examiner*—John K. Corbin

*Assistant Examiner*—Robert L. Sherman

*Attorney*—Barnes, Kisselle, Raisch & Choate

[57] ABSTRACT

An assembly for the introduction of fingerprint data in an identification system including an input surface to lie on an optical axis and a strip of light transmitting film carried on suitable wind-out and wind-in reels to provide a fresh surface when moved incrementally across the input surface. Assembly also may be moved in limited rotation for alignment.

4 Claims, 2 Drawing Figures

Patented July 18, 1972 3,677,623

Figures 1, 2:
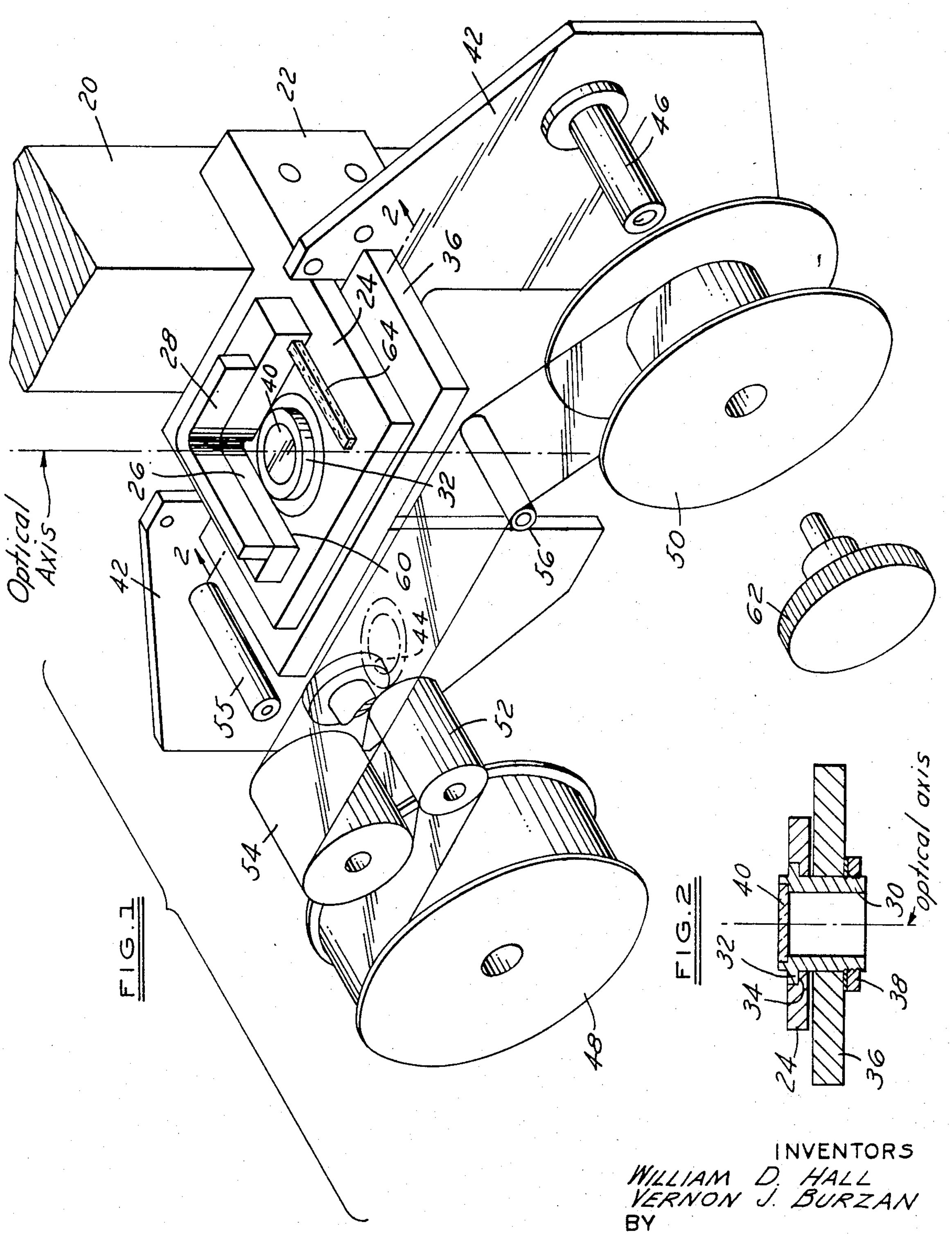

INVENTORS
WILLIAM D. HALL
VERNON J. BURZAN
BY
Barnes, Kisselle, Raisch & Choate
ATTORNEYS

CLEAN WINDOW ASSEMBLY FOR REAL TIME FINGERPRINT INPUT TO FINGERPRINTIDENTIFICATION SYSTEM

This invention relates to a Clean Window Assembly for Real Time Fingerprint Input to Fingerprint Identification System and more particularly to a means for facilitating the input of real time fingerprint data in a manner which will be convenient and trouble free.

In connection with an identification system which is described in detail in a co-pending application of Thomas et al., Ser. No. 48,373, filed June 22, 1970, on a "Method and Apparatus for Personal Identification," it is essential that a fingerprint input be provided in an optical system. Since this must be done by individuals, it is important that it be done as easily as possible and with as little chance for error as is possible.

The input generally involves impressing the fingerprint on a transparent surface with an oil film of some kind on the surface so that the fingerprint will leave a recognizable and true pattern. It is also important that a fingerprint be erased between one operation and another so that there can be no so-called noise or confusion in the input.

It is, therefore, an object of the invention to provide a fingerprint input which is simple and easy to operate.

In accordance with the present invention, a transparent surface formed of glass, located in an optical axis of an identification system, is positioned for easy access to a person using it and mounted on the assembly are two reels for wind-out and wind-in of a strip of transparent material which can pass over the input surface and serve as the receiving surface for the real time fingerprint. Either the film or the finger of the person applying the print will carry a substance such as a relatively clear oil so that the imprint will remain during the check-out cycle.

Other objects and features of the invention will be apparent in the following description and claims in which the principles of operation are set forth in connection with the best mode presently contemplated.

Drawings accompany the disclosure and the various views thereof may be briefly described as follows:

FIG. 1, a perspective view of the device showing the relationship of the parts.

FIG. 2, a sectional view on line 2—2 of FIG. 1.

REFERRING TO THE DRAWINGS

In the identification system as described in the above-referenced application, a vertical mount bar 20 carries a support bracket 22 which is mounted adjacent the side of the bar 20 and has a horizontal bracket plate or platform 24 extending transversely of the bar. On this platform, two L-shaped members 26 and 28 are positioned to locate one side and the end of a finger. The plate 24 is apertured to receive the top of a bushing 30 having a flange 32 and the flange can lie in an annular counterbore 34. This bushing is preferably formed of a material such as bronze which can have a bearing relationship with the plate 24. The bushing is used to support s sub-plate 36 which has a relatively tight fit on the shaft of the bushing and is held in place by a ring screw 38. Thus, the sub-plate 36 can rotate relative to the bracket platform 24. Also at the top of the bushing 30 is a glass disc 40 which serves as an input surface for a fingerprint.

On the back of the sub-plate 36 is a relatively wide winged plate 42 having on its opposite sides spindle mounts 44 and 46 for reels 48 and 50. In FIG. 1 these parts are shown off the spindle portions but in assembly the reels would mount against the plate 42. Guide rollers 52, 54 and 55 are provided on the left-hand side of the assembly on plate 42 suitably mounted on spindles on the plate and a guide roller 56 is also provided on the right-hand side of the assembly. The reels are intended to carry a strip of film such as, for example, a film having a polyester base such as Mylar film.

Film 48 can be the supply reel and reel 50 can be the take-up reel. The film will pass from the supply reel 48 over rollers 52, 54 and 55 to a slot formed by a cut-away portion 60 on the L-shaped member 26. The film will pass over the bushing flange 32 and the glass 40 to the roller 56 and then to the take-up reel 50 which can be manipulated by a knurled knob 62. In some instances, the film itself may carry an impressionable coating or the finger of the user may be coated with a coating of light oil before it is applied to the film. This will leave an impression at the optical axis of the unit. In order to adjust for minor variations in positioning, the plate 42 through the handle 62 can be moved 10° around the optical axis to compensate for any rotational alignment. Each time that a fingerprint is used for identification, the Mylar film can be rotated incrementally to provide a fresh surface for a new cycle of identification. It may also be desirable to put a felt wiper 64 on the right-hand side of the surface 40 to obliterate the prints as the film is moved through the unit.

What is claimed as new is as follows:

1. In an identification system using fingerprints as input data in an optical system, a fingerprint input station assembly comprising:

a. a transparent element to be located on an optical axis in an identification system serving as an input surface for a fingerprint,
b. means to mount said element comprising a support bracket having an extending member, and
c. means carrying said element supported on said member for rotation in a limited angular movement relative to an axis passing through said element.

2. In an identification system using fingerprints as input data in an optical system, a fingerprint input station assembly comprising:

a. a transparent element to be located on an optical axis in an identification system serving as an input surface for a fingerprint,
b. a mount bar and a support bracket on said bar having a first plate extending transversely to said bar, said plate having an aperture, and
c. means to mount said element to align with said aperture and to be rotatable relative to said aperture comprising a mount plate, bushing means in said plate carrying said element and having a bearing relationship with the first plate at said aperture whereby said mount plate and said element are supported on and rotatably movable relative to said first plate on an axis passing through said aperture and said element.

3. In a fingerprint input station assembly as defined as in claim 1, a. a film strip support means on said means supported on said member
b. a film strip on said support means, and
c. means to guide said film strip over said transparent element to provide a renewable surface for a fingerprint impression at said transparent element.

4. In a fingerprint input station assembly as defined in claim 2, a. a film support plate on said mount plate,
b. reel-in and reel-out reels on said film support plate, and
c. a film strip on said reels extending over said element to provide a renewable surface for a fingerprint impression at said transparent element.

* * * * *